United States Patent Office 3,508,412
Patented Apr. 28, 1970

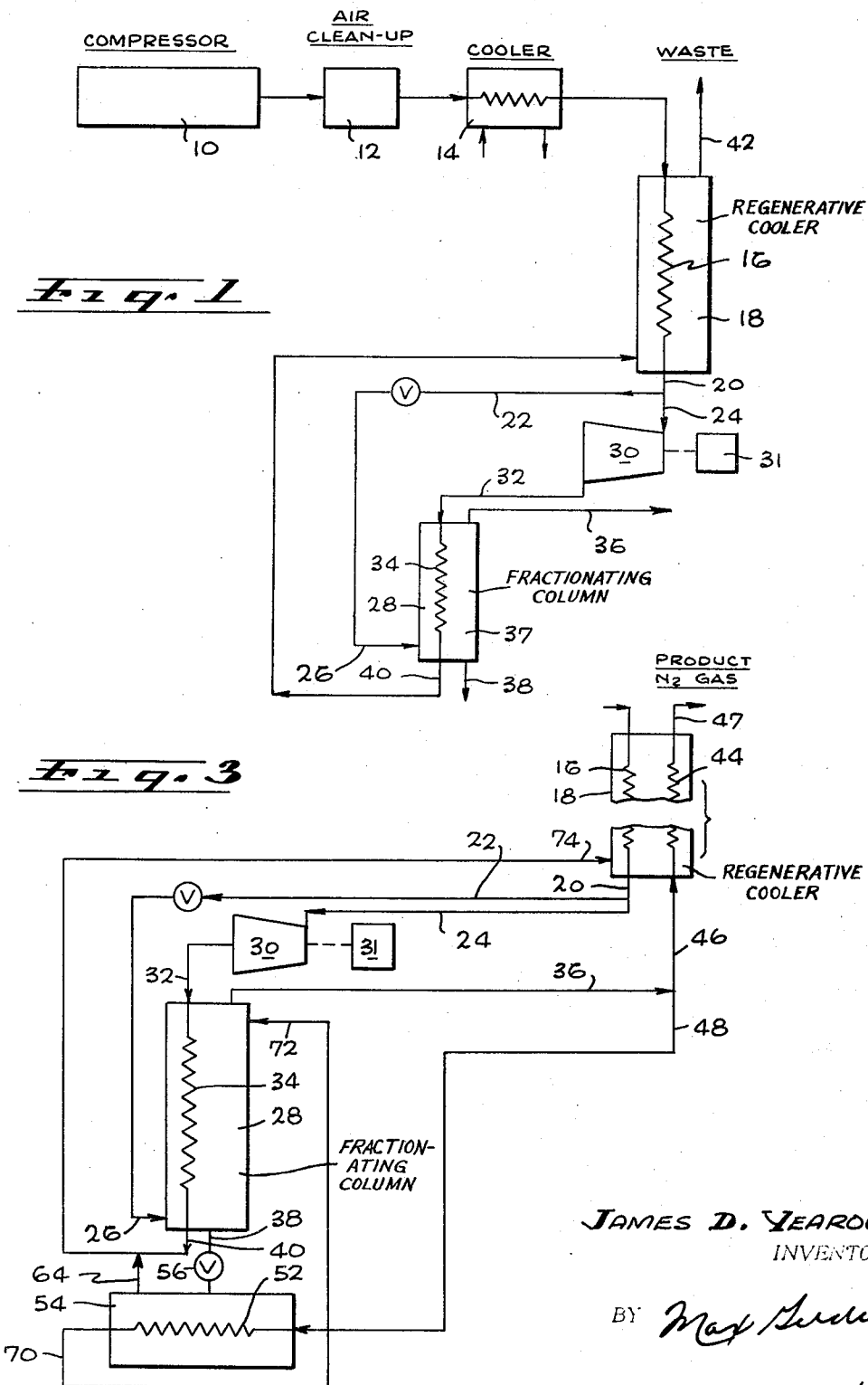

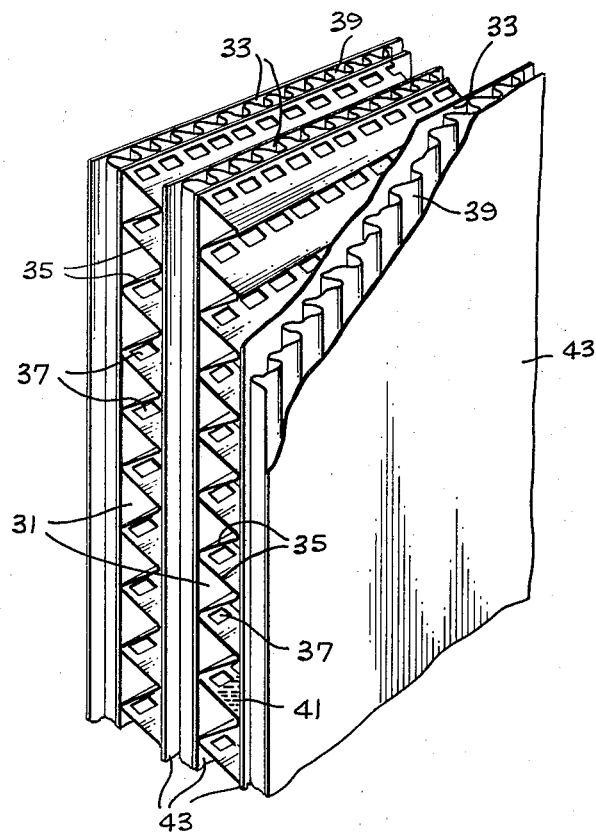

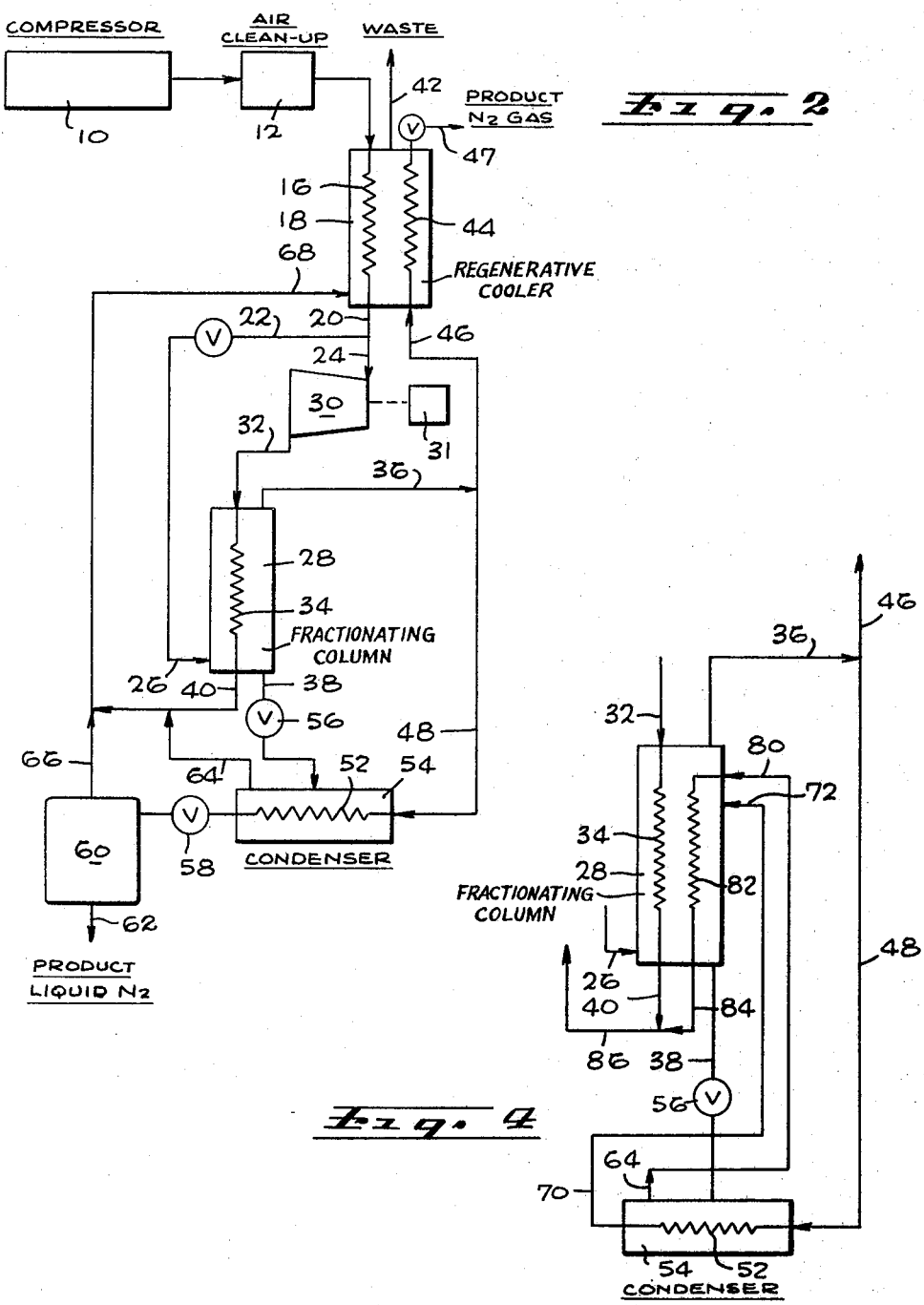

3,508,412
PRODUCTION OF NITROGEN BY AIR
SEPARATION
James D. Yearout, Rolling Hills, Calif., assignor, by mesne assignments, to McDonnell Douglas Corporation, Santa Monica, Calif., a corporation of Maryland
Filed Aug. 12, 1966, Ser. No. 572,135
Int. Cl. F25j 3/04
U.S. Cl. 62—13                        16 Claims

ABSTRACT OF THE DISCLOSURE

Process and system for the separation of nitrogen from air by rectification, employing a single fractionating column, and comprising a minimum number of components, involving regeneratively cooling compressed air feed, introducing a first portion, e.g., about 10% to about 75%, of the cool compressed air as feed into the lower portion of a fractionating column, work expanding the remaining portion of the cool compressed air, and passing the resulting further cooled and expanded air downwardly through the column in countercurrent heat exchange relation with the cold compressed air feed, to withdraw heat from the column throughout the entire height thereof, and effecting a differential distillation in the column, passing the heated, work-expanded air exiting the column into regenerative heat exchange relation with the compressed feed air for cooling same, withdrawing substantially pure cold, compressed nitrogen gas as overhead from the column, passing at least a portion of such nitrogen into heat exchange relation with the compressed air feed for cooling same, and recovering nitrogen product as gas and/or liquid, and condensing an oxygen-rich liquid in the lower portion of the column, which if desired can be expanded and employed for condensing a portion of the overhead nitrogen from the column.

---

This invention relates to the separation of nitrogen from air by rectification and is particularly concerned with improved procedure for the separation of nitrogen from air and production of nitrogen as product, either in liquid form or gaseous form, or both, at high efficiency in a single fractionating column utilizing "differential" distillation, and with a system for carrying out such procedure.

In many industrial applications, relatively small amounts of nitrogen either in liquid or in gaseous form and preferably under moderate compression are required. Thus, for example, in many chemical processing control systems, nitrogen gas in compressed form is employed as the pressure fluid for operating pneumatic controls in such systems. At present, such pressurized nitrogen, generally required in relatively modest amounts for this purpose, is being provided largely by burning out the oxygen from air, and purifying the residual gas to obtain the residual nitrogen, and compressing such nitrogen. The reason for employing compressed nitrogen as a functional fluid in hydraulic or pneumatic systems is due to the lower maintenance cost on equipment because of reduced corrosion from such fluid.

It is accordingly the main object of the invention to provide an efficient procedure and system for the separation and recovery of nitrogen, either in liquid form or gaseous form, or both, employing a relatively simple unit involving the technique of differential distillation, and having the advantages of avoiding the use of low temperature refrigerants, requiring a smaller capital investment, and affording good operating efficiency and versatility of operation.

Briefly, the invention procedure comprises moderately compressing air and subjecting such compressed air to regenerative cooling in heat exchange relation with cold air obtained from a subsequent step of the process. The cooled compressed air is then divided into two streams, a first portion or stream being introduced as feed into a fractionating column, preferably into the lower portion thereof. The remaining portion or second stream of the cooled compressed air is work expanded to further reduce the temperature of such second stream, and such expanded and further cooled air is introduced into the fractionating column, preferably at the top thereof, and is passed in heat exchange relation through the fractionating column.

While passing downwardly through the fractionating column in countercurrent relation to the air feed introduced in the bottom of the column, such cooled and expanded air withdraws heat from the column and is thus heated during passage therethrough. By passing the work expanded second stream of cold air downwardly in heat exchange relation through the column so that heat is incrementally withdrawn from the column throughout the entire height of the column, and by introduction of the cold air feed into the bottom of the column, a "differential" distillation occurs in the column, and substantially pure cold compressed nitrogen gas can be withdrawn as overhead from the upper end of the column. An oxygen-rich liquid condenses in the lower portion of the column and is removed therefrom. In effect, the fractionation procedure according to the invention amounts to employing only the upper end of a distillation column, since the product of interest is only the nitrogen which is separated from the air feed, and such nitrogen is separated in the upper portion of the column, as described in greater detail hereinafter.

The work expanded air which has passed downwardly in heat exchange relation through the column, to serve as refrigerant therein for withdrawing heat from the contents of the column, is accordingly heated by such passage through the column, and the resulting heated exiting expanded air is then passed into regenerative heat exchange relation with the compressed air for cooling same, as noted above.

According to a preferred embodiment for obtaining both liquid nitrogen and compressed nitrogen gas as products, the overhead substantially pure cold compressed nitrogen gas from the column is divided into two streams, a first stream being passed in heat exchange relation with the compressed air for cooling same, and the resulting heated compressed nitrogen gas is withdrawn as product. The remainilg portion or second stream of cold compressed overhead nitrogen gas withdrawn from the column is by-passed to a condenser, and is condensed therein by means of oxygen-rich liquid withdrawn from the bottom of the column and which is first throttled to a temperature below the temperature of the cold compressed overhead nitrogen gas at the pressure thereof, before being passed in heat exchange relation with such second by-passed stream of cold compressed nitrogen gas. The liquid nitrogen so condensed is then flashed into a receiver from which product liquid nitrogen can be withdrawn.

The cold oxygen-rich fluid exiting the nitrogen condenser, together with controlled amounts of cold nitrogen vapor from the liquid nitrogen receiver can be recirculated and brought into heat exchange relation with the compressed air for cooling same, as will be described in greater detail hereinafter.

The relative amounts of product liquid nitrogen and compressed product nitrogen gas which is desired can be controlled by suitably varying the ratio of the cold compressed air feed to the bottom of the column to the amount of cold compressed air which is work expanded and fed into the top of the column and passed into heat exchange relation with the column, as previously described. Thus, from about 10% to about 75% of the cold compressed air can be fed to the bottom of the column, the remainder being work expanded and fed to the top of the column.

If desired, the process can be controlled to obtain as product substantially entirely liquid nitrogen or compressed nitrogen gas as product. Thus, for example, according to another embodiment of the invention, where essentially only compressed nitrogen gas is required as product, liquid nitrogen condensed as described above can be recirculated to the column to function as reflux therein, and also, if desired, and as an additional alternative, oxygen-rich fluid exiting the nitrogen condenser can also be recirculated to the top of the column and passed downwardly through the column in heat exchange relation with the contents thereof to further cool same, and the resulting exiting oxygen-rich fluid from the bottom of the column can be recirculated in heat exchange relation with the compressed incoming air for cooling same.

The invention will be understood more clearly by the description below of certain embodiments of the invention, taken in connection with the accompanying drawing wherein:

FIG. 1 is a schematic representation of the basic novel system of the invention;

FIG. 1a illustrates a heat exchanger arrangement which can be employed in the fractionating column of FIG. 1;

FIG. 2 is a schematic representation of a system for separating nitrogen from air to obtain both liquid nitrogen and compressed nitrogen gas as products, employing the invention principles;

FIG. 3 illustrates a modification of the system of FIG. 2, for obtaining only compressed nitrogen gas as product; and FIG. 4 illustrates a modification of the system illustrated in FIG. 3.

Referring to FIG. 1 of the drawing illustrating the basic principles of the invention, air is compressed at 10, and is first preferably passed through a conventional air clean-up stage 12 for removal of moisture and impurities such as carbon dioxide, and then, although not necessarily, can be passed through a precooler 14.

The resulting compressed air is then passed through a cooling coil 16 of a regenerator 18 in countercurrent heat exchange relation with cold air produced from a subsequent stage of the operation and passing upwardly through the regenerator. The cold compressed air exiting the regenerator at 20 is then divided into two streams 22 and 24, one of such cold air streams 22 being fed as indicated at 26, preferably near and somewhat above its saturation temperature, into the lower end of a fractionating column 28. The second stream 24 of cold compressed air is work expanded in an expander or cold turbine indicated at 30, to further reduce the temperature of the second stream of cold compressed air below the temperature of the air feed stream 22. The work derived from the expander 30 is used to drive a generator 31. The resulting cold work expanded air stream at 32 is introduced into the top of the fractionating or differential distillation column 28 and is passed downwardly in the column through a heat exchanger arrangement 34 in countercurrent flow to the air feed introduced into the column at 26. The work expanded cold air thus circulating downwardly through the heat exchanger 34 abstract or withdraws heat from the column throughout the entire length of the column, causing a differential distillation of the air in the column.

As result of such differential distillation occuring in the column, a substantially pure cold compressed nitrogen overhead 36 is withdrawn from the top of the column and an oxygen-rich liquid is condensed in the bottom of the column. Substantially no stripping action occurs in the column and the lower portion 37 of the column functions essentially as a condensing section, in which an oxygen-rich liquid is condensed, and is withdrawn at 38. The heated work expanded air is withdrawn from the heat exchanger arrangement 34 at the bottom of the column and is recirculated as indicated at 40 to the bottom of the regenerator 18, and passes upwardly therein to cool the incoming compressed air passing through coil 16 of the regenerator as described above. The exiting heated and expanded air thus recirculated is withdrawn from the top of the regenerator as waste, as indicated at 42.

The heat exchanger construction 34 in the fractionating or differential distillation column 28 can be in the form of a plate-fin heat exchanger arranged so that the work expanded cold air at 32 introduced into such exchanger is passed in heat exchange relation with channels of such construction, bearing the liquid-vapor mixture being separated. Such channels may be constructed in the manner of a perforated fin compact heat exchanger, producing the effect of distillation column trays. This is a known type of heat exchanger arrangement, and is illustrated in FIG. 1a. In FIG. 1a, channels 31 containing the horizontally corrugated plates 35 and slots 37 bear the liquid-vapor mixture, and the intermediate alternate channels 33 containing the vertically corrugated plates 39 provide the passages for the cold air passing downwardly therethrough to cool the vapor-liquid mixture in channels 31, vertical plates 43 separating channels 31 and 33. Liquid reflux passes downwardly through channels 31, collecting in the troughs formed by the corrugations, as indicated at 41, until it overflows through the slots 37. The vapor passes upwardly through channels 31 via the slots 37, and impinges on the liquid film flowing from the slots 37 above. Such heat exchanger construction is illustrative only, and forms no part of the present invention.

Since the temperature of the work expanded air passing through the heat exchanger 34 is lower than the temperature in the column 28, heat is withdrawn throughout the length of the column under conditions to provide substantial equilibrium of the vapor and liquid throughout the column. No heat is applied to the lower portion of column 28, and hence there is no boiling section in the lower portion of the column, and the lower portion 37 of the column 28 hereof only functions as a condensing section.

Now referring to FIG. 2 of the drawing, illustrating a preferred system for separating nitrogen from air and recovering liquid nitrogen and compressed nitrogen gas as products, atmospheric air is first compressed at 10 to about 115 p.s.i.a. and following clean-up at 12 is then cooled by passage through one side 16 of the regenerative heat exchanger 18 in countercurrent heat exchange relation with cold air and other gases introduced at 68 into the heat exchanger, and also by cold nitrogen gas passing through the other side 44 of the regenerator shown in FIG. 2.

The compressed air leaving the regenerator at 20 is now at a temperature of 225° R. (Rankine), and about 45% of the cold air stream 20 is introduced as feed at 26 into the lower end of the fractionating or differential distillation column 28. The remainder or about 55% of the cold compressed air at 20 is passed at 24 into the expander or cold turbine 30, and the exiting cold expanded air at 32 is now further cooled to a temperature of 150° R. and the pressure reduced to about 16 p.s.i.a. During passage of the expanded cold air through the heat exchange arrangement 34 of the fractionating column 28, heat is withdrawn from the column and the temperature of the expanded cold air exiting the lower end of the column at 40 is 220° R. As previously noted, the ratio of cold compressed air at 20 which is fed into the lower end of the column at 26, to that which is charged to the expander 30 is dependent on the ratio of liquid to gaseous nitrogen product which is desired. Thus, for example, the percentage of cold air at 20 which can be fed at 26 to the lower end of the fractionating column in this embodiment can range from about 10% to about 50% of the total amount of cold air discharged from the regenerator at 20, the remainder being charged to the expander 30.

The pressure within the fractionating column 28 is about 100 p.s.i.a. and as result of the differential distillation operation which takes place in the column as described above, substantially pure, that is greater than 99% nitrogen, is withdrawn as overhead at 36 from the column, and an oxygen-rich liquid containing about 50% oxygen and about 50% nitrogen, and a small amount of argon, condenses at the bottom of column 28.

About 90% of the nitrogen overhead at 36 is passed at 46 through side 44 of the regenerative heat exchanger 18 in countercurrent heat exchange relation with compressed air passing through side 16 of the regenerator for cooling same, as noted above. Product nitrogen gas at a pressure of 100 p.s.i.a. and ambient temperature is withdrawn at 47.

The remaining portion or about 10% of the overhead nitrogen at 36 is bypassed via line 48 and is conducted through coil 52 of the condenser 54, and oxygen-rich liquid withdrawn at 38 from the bottom of the fractionating column, is throttled by valve 56 to a reduced pressure of about 15 p.s.i.a. and is introduced into the condenser 4 in heat exchange relation with the compressed nitrogen passing through coil 58 of the condenser, and such compressed nitrogen is liquefied by the boiling oxygen-rich liquid. The liquid nitrogen exiting the condenser 54 is flashed by valve 58 and is discharged into the tank 60 at a storage pressure of 15 p.s.i.a. and such compressed liquid nitrogen can be withdrawn at 62 as product.

The cold oxygen-rich vapor leaving the condenser 54 at 64, and a controlled amount of nitrogen vapor discharged from the liquid nitrogen storage tank at 66, are combined with the cold work expanded air leaving the fractionating column at 40, and these combined vapors at a temperature of 220° R. and a pressure of 15 p.s.i.a. are conducted via line 38 into the lower end of the regenerator 18, and are passed upwardly therein countercurrent to the compressed feed air passing through 16, for cooling same, and the exiting waste gases are withdrawn from the top of the regenerator at 42 at about ambient temperature and pressure.

In FIG. 3 there is illustrated a modification of the system shown in FIG. 2 and described above. The system of FIG. 3 is practiced when it is desired to obtain only compressed nitrogen gas as product. According to this modification, the liquid nitrogen exiting the condenser 54 at 70, instead of being flashed as indicated at 58 in FIG. 2, is recirculated to the top of the differential distillation column 28, and is introduced therein at 72. Such liquid nitrogen added as reflux to the top of the column functions to increase the quantity of product nitrogen gas recovered at 47, over the amount which would otherwise be produced in the absence of such recirculation of the condensed liquid nitrogen. Also, in this modification for producing solely product nitrogen gas, the ratio of cold compressed air at 20 fed to the fractionating column at 26, to the cold air diverted at 24 to the expander 30 is changed, so that the amount of such cold feed air at 26 is 70% and the amount introduced into the expander 30 is 30%. Also, in this modification the cold oxygen-rich fluid or vapor leaving the condenser 54 at 64 is combined with the cold air exiting the heat exchange arrangement 34 at the bottom of the column at 40, and these combined cold vapors are passed at 74 into the lower end of the regenerator 18 to function in conjunction with the cold nitrogen gas circulated through 44, for cooling the incoming air in 16, as previously described.

FIG. 4 illustrates a modification of the system illustrated in FIG. 3 and described above, for obtaining solely compressed nitrogen gas as product. According to the modification of FIG. 4, the cold oxygen-rich vapor at reduced pressure and exiting the nitrogen condenser at 64, is recirculated via line 80 to the top of an additional heat exchanger arrangement 82 extending through the fractionating column 28 adjacent the heat exchanger arrangement 34 therein. Such cold oxygen vapor passing through the heat exchanger 82 further cools the contents of column 28 and increases the efficiency thereof for production of compressed nitrogen gas product. The heat exchanger arrangements 34 and 82 can be built into the fractionating column in the form of a plate-fin compact heat exchanger of the type previously mentioned, and including channels forming the passage 34 and separate channels forming the passage 82, with perforations or passages therebetween for the liquid-vapor mixture being separated in the column 28. The cold oxygen-rich vapor exiting the heat exchanger arrangement 82 at 84, and the cold expanded air leaving exchanger 34 at 40, can be combined at 86 and recirculated to the regenerator 18, as described with respect to FIG. 3 above.

Although in the systems illustrated in FIGS. 1 to 3 and described above, the expander or cold turbine 30 is shown as driving a generator 31, if desired, such expander 30 can be coupled to the compressor 10 to furnish a portion of the energy required for compression of the air, or such expander 30 can be coupled to a boost compressor (not shown) which can be incorporated in the system between the main compressor 10 and the regenerator 18, for further increasing the pressure of the air feed.

In preferred practice, a plate-fin type of heat exchanger arrangement is employed in the fractionating or differential distillation column 28, at 34 and also at 82, as described above, to bring the cold expanded air from expander 30, and also the cold oxygen-rich vapors exiting the nitrogen condenser 54, as shown in FIG. 4, through the column 28 into efficient heat exchange relation with the liquid and gas throughout the column. However, any suitable form of heat exchanger arrangement can be employed for this purpose. Thus, for example, a column having conventional trays or plates can be employed with suitable heat exchanger means utilized for conducting such cold expanded air at 34 in FIGS. 1 to 4, and cold oxygen-rich vapors at 82 in the embodiment of FIG. 4, into heat exchange relation with such trays or plates, preferably so as to effect the above described differential distillation in the column.

From the foregoing, it is seen that the invention provides a novel improved method particularly designed for separating and providing substantially pure nitrogen, either as a liquid product or compressed nitrogen gas, or both, employing a single fractionating column in a relatively simple system comprising a minimum number of components, and affording a substantial reduction in capital expense. The system of the invention is of particular advantage where relatively small quantities of nitrogen, preferably under pressure, are required. By means of the differential distillation technique according to the invention, the use of a fractionating column of substantially smaller size is permitted, further reducing the cost of the system. The operating efficiency of the system of the invention compares favorably with prior art systems for separating and recovering essentially nitrogen as product. The invention system is particularly adapted for use in producing nitrogen for application in chemical processing control systems as the pressure fluid for operating pneumatic controls in such systems.

While I have described particular embodiments of my invention for the purpose of illustration, it should be understood that various modifications and adaptations thereof may be made within the spirit of the invention, and within the scope of the appended claims.

I claim:

1. A process for the separation of nitrogen from air, which comprises compressing air, subjecting said compressed air to regenerative cooling in heat exchange relation with cold air, introducing a first portion of said cooled compressed air into a fractionating column, work expanding the remaining portion of said cooled compressed air and further reducing the temperature without fractionation or separation thereof, passing said further cooled and expanded air downwardly in indirect and counter current heat exchange relation through the entire length of said fractionating column, said cooled and expanded air withdrawing heat from said column and being heated during passage therethrough, partially condensing said first portion of cooled compressed air in said column, passing said heated work expanded air exiting said fractionating column into regenerative heat exchange relation with said compressed air for cooling same as aforesaid, withdrawing substantially pure cold compressed nitrogen gas as overhead from the upper end of said column, and condensing an oxygen-rich liquid in the lower portion of said column by said partial condensation.

2. A process as defined in claim 1, wherein about 10 to about 75% of said cooled compressed air is fed into said fractionating column, the remainder being work expanded.

3. A process as defined in claim 1, wherein said first portion of cooled compressed air is fed into the lower portion of said column, and said further cooled and expanded air is introduced into the top of said column and flows downwardly through said column in counter-current heat exchange relation with said cold compressed air fed into the lower portion of said column, and effecting a differential distillation of said first portion of partially condensed air in said column.

4. A process as defined in claim 1, including passing at least a portion of said cold compressed overhead nitrogen gas into heat exchange relation with said compressed air for cooling same, and withdrawing the heated exiting nitrogen gas as product.

5. A process as defined in claim 1, including withdrawing oxygen-rich liquid from the lower end of said column, throttling said withdrawn oxygen-rich liquid to a temperature below that of said cold compressed overhead nitrogen gas at the pressure thereof, passing the resulting throttled oxygen-rich fluid into heat exchange relation with at least a portion of said cold compressed nitrogen gas, and liquefying said last mentioned gas to produce liquid nitrogen.

6. A process as defined in claim 1, including passing a portion of said cold compressed nitrogen gas into heat exchange relation with said compressed air for cooling same, and withdrawing the heated exiting nitrogen gas as product, by-passing the remaining portion of said cold compressed overhead nitrogen gas, withdrawing oxygen-rich liquid from the lower end of said column, throttling said withdrawn oxygen-rich liquid to a temperature below that of said cold compressed overhead nitrogen gas at the pressure thereof, passing the resulting throttled oxygen-rich fluid into heat exchange relation with said by-passed cold compressed nitrogen gas, and liquefying said last mentioned gas to produce liquid nitrogen product.

7. A process as defined in claim 1, wherein said first portion of cooled compressed air is fed into the lower portion of said column, and said further cooled and expanded air is introduced into the top of said column and flows downwardly through said column in countercurrent heat exchange relation with said cold compressed air in said column, and effecting a differential distillation of said partially condensed air in said column, including passing a portion of said cold compressed overhead nitrogen gas into heat exchange relation with said compressed air for cooling same, and withdrawing the heated exiting nitrogen gas as product, bypassing the remaining portion of said cold compressed overhead nitrogen gas, withdrawing oxygen-rich liquid from the lower end of said column, throttling said withdrawn oxygen-rich liquid to a temperature below that of said cold compressed overhead nitrogen gas at the pressure thereof, passing the resulting throttled oxygen-rich fluid into heat exchange relation with said bypassed cold compressed nitrogen gas, and liquefying said last mentioned gas to produce liquid nitrogen product.

8. The process as defined in claim 7, including passing the exiting oxygen-rich fluid into heat exchange relation with said compressed air for cooling same.

9. The process as defined in claim 7, including flashing said liquefield nitrogen, and producing liquid nitrogen product and nitrogen vapor at the pressure of said liquid product, and passing at least a portion of said flashed nitrogen vapor into heat exchange relation with said compressed air for cooling same.

10. A process as defined in claim 1, including withdrawing oxygen-rich liquid from the lower end of said column and recirculating said last mentioned liquid into the upper end of said fractionating column and passing said liquid in heat exchange relation through said column.

11. A process for the production of substantially pure nitrogen as product from air, which comprises moderately compressing air, regeneratively cooling said compressed air, introducing a first portion of said cooled compressed air as feed into the lower end of a fractionating column and partially condensing therein said first portion of said cooled compressed air, said first portion comprising about 10% to about 50% of said cooled compressed air, work expanding the remaining portion of said cooled compressed air and further reducing the temperature thereof, introducing said further cooled and expanded air into the top of said column and passing said last mentioned cold expanded air downwardly through said column in countercurrent and indirect heat exchange relation with said cold compressed air fed into the lower portion of said column, said cooled and expanded air withdrawing heat from said column and being heated during passage therethrough, and effecting a differential distillation of said first portion of partially condensed air in said column, withdrawing substantially pure cold compressed nitrogen gas as overhead from the upper end of said column, passing said heated expanded air exiting the lower end of said fractionating column into regenerative heat exchange relation with said compressed air for cooling same as aforesaid, passing a portion of said cold compressed nitrogen gas overhead into heat exchange relation with said compressed air for cooling same, and withdrawing the resulting heated exiting compressed nitrogen gas as product, bypassing the remaining portion of said cold compressed overhead nitrogen gas, withdrawing oxygen-rich liquid from the lower end of said column, throttling said withdrawn oxygen-rich liquid to a temperature below said cold bypassed compressed overhead nitrogen gas, passing the resulting throttled oxygen-rich liquid into heat exchange relation with said bypassed cold compressed nitrogen gas, and liquefying said bypassed cold compressed gas, flashing said liquid nitrogen and producing liquid nitrogen product and nitrogen vapor in equilibrium therewith, and passing the heated oxygen-rich fluid and at least a portion of said flashed nitrogen vapor into heat exchange relation with said compressed air for cooling same.

12. A system for the separation of nitrogen from air, which comprises means for compressing air, regenerator means for cooling said compressed air in heat exchange relation with cold air, a fractionating column, means for introducing a first portion of said cooled compressed air into said fractionating column, means for work expanding the remaining portion of said cooled compressed air and further reducing the temperature without fractionating or separation thereof, heat exchange means for passing said further cooled and expanded air downwardly in indirect and countercurrent heat exchange relation through the entire length of said fractionating column and partially condensing said first portion of cooled compressed air in said column, means for passing said work expanded air exiting said fractionating column into said regenerator means in heat exchange relation with said compressed air for cooling same as aforesaid, and means for withdrawing substantially pure cold compressed nitrogen gas as overhead from the upper end of said column and means for withdrawing an oxygen-rich liquid from said partial condensation from the lower end of said column.

13. A system as defined in claim 12, wherein said means for introducing said first portion of said cooled compressed air into said column is connected to the lower portion of said column, and said means for passing said further cooled and expanded air through said fractionating column includes means for introducing said further cooled and expanded air into the top of said column in communication with said heat exchange means in said column to permit flow of said cooled and expanded air downwardly through said column in countercurrent heat exchange relation with said cold compressed air feed into the lower portion of said column, and effecting a differential distillation of said first portion of partially condensed air in said column.

14. A system as defined in claim 13, including means for passing a portion of said cold compressed overhead nitrogen gas into heat exchange relation with said compressed air for cooling same, means for withdrawing the resulting heat exiting nitrogen gas as product, means for bypassing the remaining portion of said cold compressed overhead nitrogen gas, means for throttling said withdrawn oxygen-rich liquid to a temperature below said cold compressed overhead nitrogen gas at the pressure thereof, means for passing the resulting throttled oxygen-rich liquid into heat exchange relation with said bypassed cold compressed gas and liquefying said last mentioned gas, and means for withdrawing liquid nitrogen product.

15. A system as defined in claim 14, including means for flashing said liquefied nitrogen, an enclosed zone for collecting liquid nitrogen product and nitrogen vapor at the pressure of said liquid product, means for passing at least a portion of said flashed nitrogen vapor into heat exchange relation with said compressed air for cooling same, and means for passing the exiting oxygen-rich fluid into heat exchange relation with said compressed air for cooling same.

16. A process for the separation of nitrogen from air, which comprises compressing air, subjecting said compressed air to regenerative cooling in heat exchange relation with cold air, introducing a first portion of said cooled compressed air into a fractionating column, work expanding the remaining portion of said cooled compressed air and further reducing the temperature without fractionation or separation thereof, passing said further cooled and expanded air downwardly along the entire length of said fractionating column in indirect and countercurrent heat exchange relation with the fractionating contents of said column, said further cooled and expanded air withdrawing heat from said column contents and being heated by said column contents, partially condensing said first portion of cooled compressed air in said column, passing said heated work expanded air exiting said fractionating column into regenerative heat exchange relation with said compressed air for cooling same as aforesaid, withdrawing substantially pure cold compressed nitrogen gas as overhead from the upper end of said column, and condensing an oxygen-rich liquid in the lower portion of said column by said partial condensation.

References Cited

UNITED STATES PATENTS

| | | | |
|---|---|---|---|
| 2,660,038 | 11/1953 | Pool | 62—38 XR |
| 2,763,138 | 9/1956 | Tsunoda | 62—39 XR |
| 2,802,349 | 8/1957 | Skaperdas | 62—38 XR |
| 3,209,548 | 10/1965 | Grunberg et al. | 62—13 XR |
| 3,258,930 | 7/1966 | Jakob | 62—29 |
| 3,264,831 | 8/1966 | Jakob | 62—29 XR |
| 3,261,168 | 7/1966 | Ruhemann et al. | 62—38 XR |
| 2,655,796 | 10/1953 | Rice | 62—14 |
| 2,664,719 | 1/1954 | Rice et al. | 62—14 XR |
| 2,709,348 | 5/1955 | Yendall et al. | 62—14 |
| 2,817,215 | 12/1957 | Sixsmith | 62—29 XR |
| 2,946,199 | 7/1960 | Collins | 62—13 |
| 2,981,082 | 4/1961 | Sixsmith | 62—13 XR |
| 2,619,810 | 12/1952 | Rice et al. | 62—14 |
| 3,251,190 | 5/1966 | Seidel | 62—14 |

NORMAN YUDKOFF, Primary Examiner

U.S. Cl. X.R.

62—29, 38